Feb. 23, 1954          G. KOPP                2,670,008
                 MANUALLY ADJUSTABLE VALVE
Filed March 16, 1950                    3 Sheets-Sheet 1

Inventor
George Kopp
By
his Attorney

Feb. 23, 1954  G. KOPP  2,670,008
MANUALLY ADJUSTABLE VALVE
Filed March 16, 1950  3 Sheets-Sheet 2

Inventor
George Kopp
By
his Attorney

Feb. 23, 1954  G. KOPP  2,670,008
MANUALLY ADJUSTABLE VALVE
Filed March 16, 1950  3 Sheets-Sheet 3

Patented Feb. 23, 1954

2,670,008

UNITED STATES PATENT OFFICE 2,670,008

MANUALLY ADJUSTABLE VALVE

George Kopp, Rugby, England

Application March 16, 1950, Serial No. 150,057

6 Claims. (Cl. 137—592)

This invention relates to manually adjustable valves primarily for correctly metering the flow of relatively small amounts of oil or other liquid flowing by gravity.

An object of the invention is to ensure a positive link between a movable valve member and its manually operable control for the purpose of obtaining an accurately defined delivery of liquid at each predetermined static head and viscosity of the liquid under flow, thereby enabling the efficiency of the valve to be maintained at all rates of fluid flow with the knowledge that said rate is in fact strictly consistent with the adjusted position of the manual control at all open positions.

Another object is to ensure that at an end position only of the manual control the valve is closed by the application of a resilient load on the movable valve member so as to permit relative adjustment between the manual control and the valve member solely at the closed position of the former, in order to allow for wear on the valve member, or its sealing ring, and its seating when positively closing the valve.

A valve of the present invention may be fitted in a valve casing for regulating the liquid flow therethrough, but again it may be fitted in an oil supply reservoir adapted for supplying oil by gravity to an oil fuel burner or other consumption apparatus.

In a valve according to the present invention the motion of a valve member for metering the liquid flow is helical under the control of, and over a part of the displacement of, a manually operable handle, but is axial under the urge of a resilient load alone over the remainder of the displacement of said handle for closing the valve.

Further by the present invention the valve member includes a piston which is located wholly between inlet and outlet ports of a casing when the valve is closed and has a peripheral helical groove which on opening of the valve is progressively exposed, the rate of flow through the valve casing being determined by the unexposed length of groove along which the fluid must flow to the outlet.

A cam device comprising a helical cam surface or groove over part of its length and a recess over the remainder engages a peg or projection in order to hold the valve member in an open position against the resilient load, the position of the peg relatively to the helical part of the cam surface, and thus the degree of valve opening, being adjustable by angular displacement of the valve member about its axis, and the location of the peg within the recess enabling axial closing movement of the member independently of its angular displacement and under the action of the resilient load.

The valve member preferably has a resilient sealing ring adapted to engage with the valve seat, said ring being brought positively by the resilient load on the valve member into operative contact with the valve seat, to close the valve, independently of the wear on said ring.

The said invention is more particularly described with reference to the accompanying drawings in which.

Figure 1:
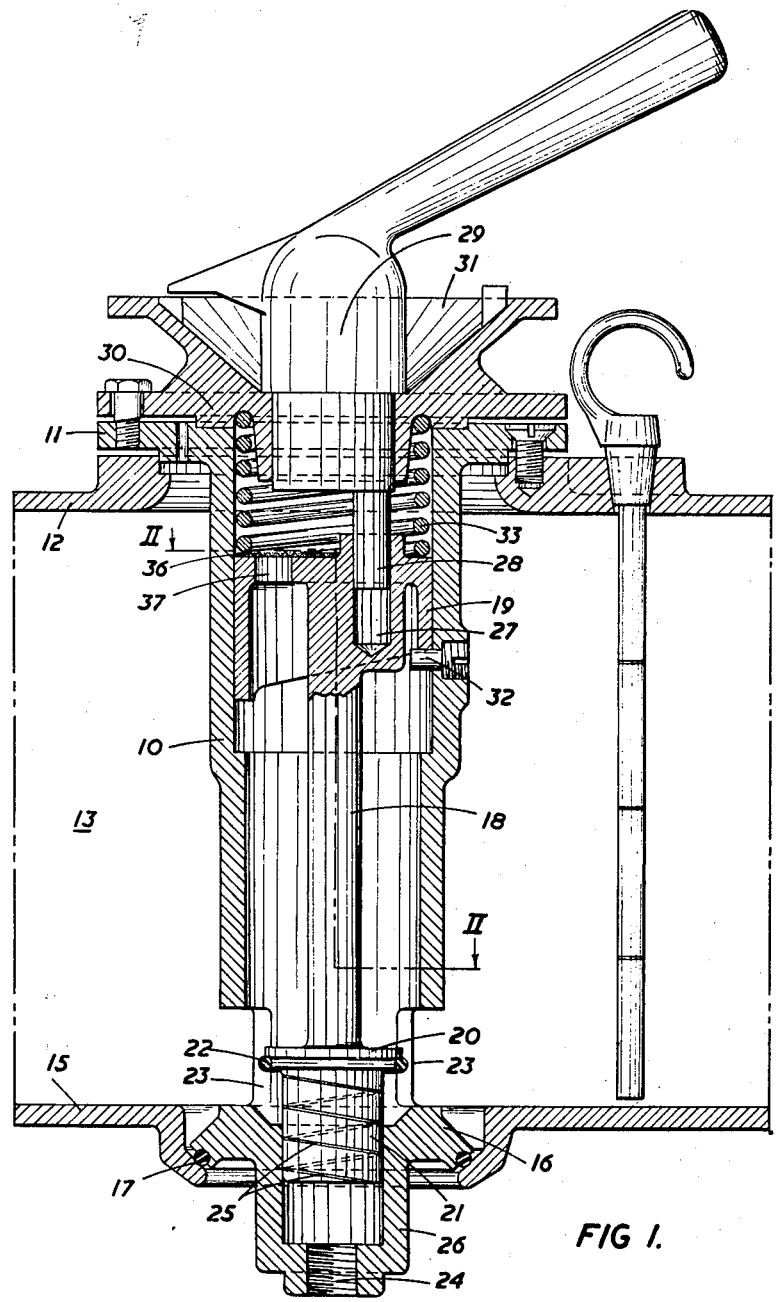
Figure 1 is a vertical sectional view through a valve fitted within an oil supply reservoir for controlling the oil outlet therefrom.
Figure 2:
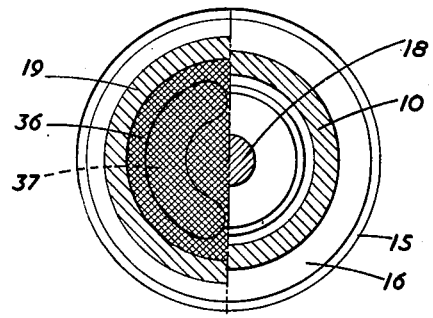
Figure 2 is a sectional view on the line II—II of Figure 1.

In the construction according to Figures 1 and 2 of the drawings a valve casing 10 is flanged at 11 to enable it to be connected to the top 12 of a supply tank 13 and extends between an opening in said top and a coaxial opening 14 in the base 15 of the tank where a flange 16 of the casing is supported on said base through the intermediary of a resilient packing ring 17 so as to prevent any flow of oil or other liquid from the tank other than through the valve casing 10.

The valve member comprises a stem 18, a skirt 19, a head 20 and a cylindrical piston part 21. The head 20 carries a resilient valve ring 22 which in the lowermost position of the valve member is adapted to cut off inlet ports 23 from an outlet 24 in that it engages with the flange 16 of the valve casing to constitute an effective closure for the latter in preventing flow of liquid from the tank or reservoir 13 through the inlet ports 23 of the valve casing and thence through the outlet 24 thereof.

The piston part 21 of the valve member has a helical groove 25 formed on its periphery, the arrangement being such that the groove becomes progressively exposed on opening of the valve member, when it is raised relatively to the casing, whereby the rate of flow of liquid from the tank 13 through the inlet ports 23 of the valve casing and thence through the outlet 24 thereof is determined by the length of the unexposed part of the groove covered by the lower or cylindrical part 26 of the valve casing through which the liquid must flow.

Although a single helical groove 25 is shown in the drawings, it will be appreciated that a plurality of helical grooves may be provided from one end of the piston part 21 to the other or again, where a plurality of grooves are provided, that one or more of these may extend over part only of the piston 21 whereby the rate of flow may be a non-continuous function of piston displacement.

At the other end of the valve member an eccentric slot 27 is provided for the reception of the eccentrically disposed pin 28 on a handle 29 which is adapted for angular displacement centrally of a cover 30 having a funnel shaped upper part 31. This rotation of the handle effects equal rotation of the valve member.

Figure 5:
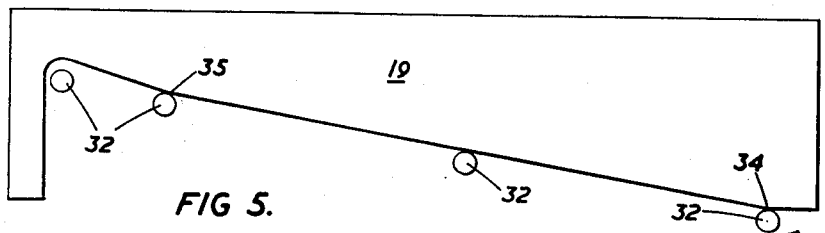
Figure 5 is a development of the helical cam surface of the valve member of each construction.

The lower edge of the skirt 19 has a helical contour to constitute a cam surface for engagement by a peg 32 rigidly mounted on the valve casing. A spring 33 is provided between the cover 30 and the top of the valve member, said spring constituting a resilient load for maintaining the helical cam surface of the skirt 19 in contact with the peg 32 at all positions of the valve member except the fully closed position, when the spring 33 operates to press the resilient valve ring 22 of the valve head 20 into effective closing relationship with the upper face of the flange 16 of the valve casing. This will be seen from the development of the helical cam surface as illustrated in Figure 5. In this figure the peg 32 is at the position 34 when the valve is fully open and is at 35 when the idle position is reached, i. e. the valve is about to be closed. Further rotary movement of the valve member and its skirt 19 then involves separation of the peg 32 from the helical cam surface whereby the resilient load created by the spring 33 is adapted to operate directly on the valve ring 22.

In order to feed oil or other liquid into the tank or reservoir 13 the handle 29 is removed from the valve cover 30 and the liquid is poured into the top of the valve casing whence it passes through a strainer gauze 36, thence through an arcuate opening 37 in the top of the valve member and downwardly through the casing 10 and finally into the tank or reservoir through the inlet ports 23 of the valve casing.

When it is desired to change the rate of flow of oil or other liquid from the tank or reservoir to a consumption point the handle is reinserted into position with its pin 28 in engagement within the slot 27 of the valve member whereupon the handle is rotated by an amount consistent with the desired opening of the valve. When this has been done the handle may again be removed to prevent unauthorised interference with the valve and the controlled flow of liquid from the tank or reservoir to the consumption point.

Figure 4:
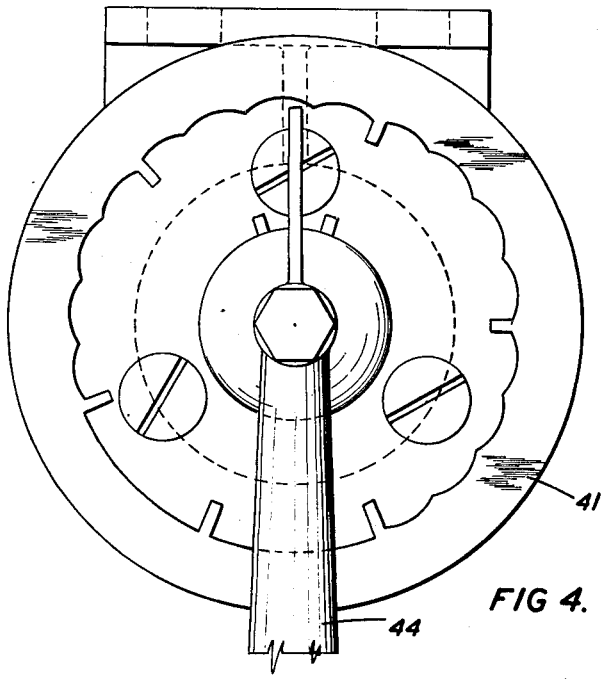
Figure 4 is a plan view of the construction according to Figure 3.
Figure 3:
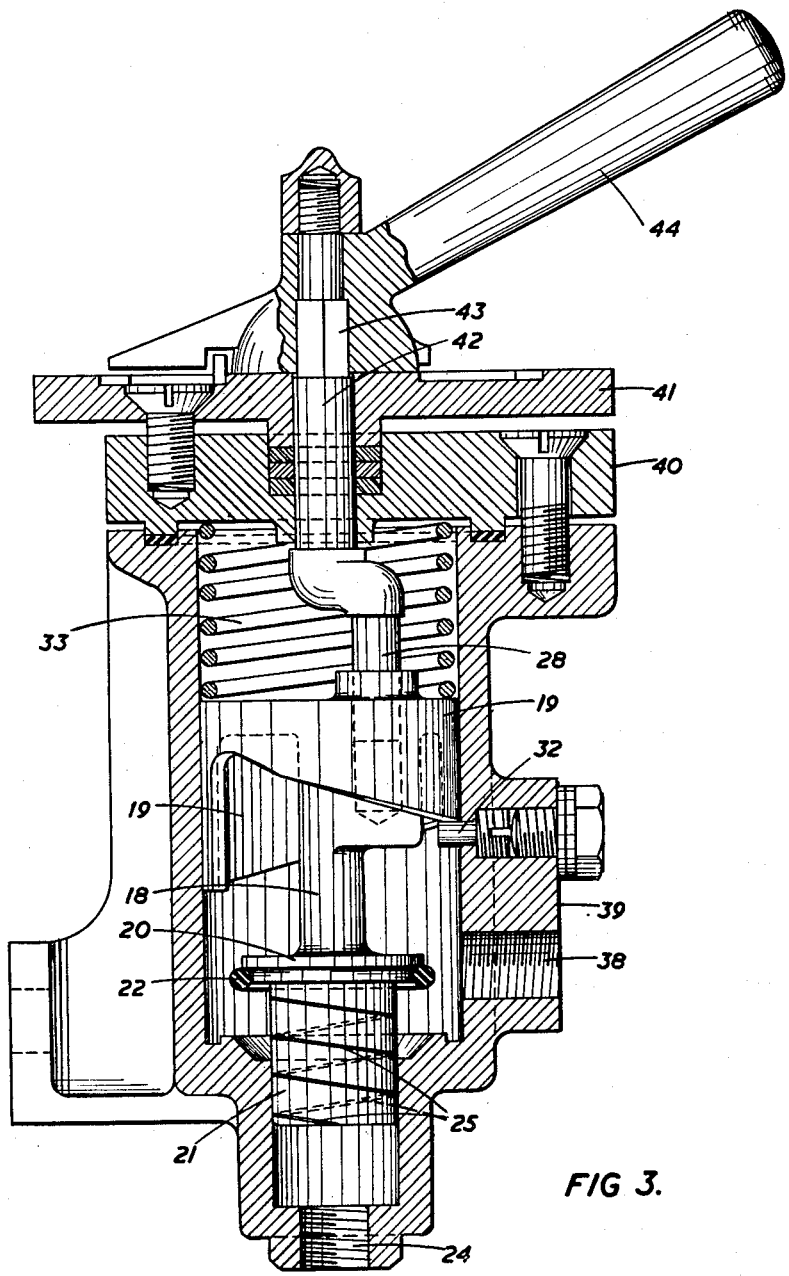
Figure 3 is a vertical sectional view through a modified form of valve adapted to control the flow of oil at any position in the supply line from a supply source to a consumption point.

In the modified form of construction illustrated in Figures 3 and 4 wherein the valve casing is provided at any convenient position in a supply line from the tank or reservoir to a consumption point for oil or other liquid, a pipe from the tank is connected to an inlet port 38 provided near the base of the valve casing 39 whilst the pipe leading to the consumption point is connected to the outlet 24. The funnel shaped cover of Figure 1 is replaced by a flat cover 40 to which a dial 41 is rigidly connected, said dial constituting a gland for a spindle 42 having a non-circular upper end 43 adapted for engagement by a rotatable handle 44 having a complementary recess adapted to receive said upper end.

It will be appreciated that in each form of construction the flow of liquid through the valve casing is stopped at a predetermined position of the valve operating handle 29, 44, irrespective of the wear of the resilient ring 22 and of its valve seating, this being achieved by substituting an axial motion to the valve member unitary structure 18, 19, 20, 21, 22 and 25, under the control of the spring 33 for the helical motion under the manual rotation of the handle 29, 44 and the interengagement of the peg 32 with the cam surface on the skirt 19. In this respect the axial motion of the valve member continues under the action of the spring 33 until the sealing ring 22 effectively obturates the fluid passages whatever the state of wear of the ring and the valve seat may be, whereas on the contrary, in any other but the end position referred to, there is a fixed geometrical relationship between the position of the valve member and the position of the operating handle.

Having now particularly described and ascertained the nature of my said invention and in what manner the same is to be performed, I declare that what I claim is:

1. A flow control and filling device for a receptacle comprising a hollow casing disposed in said receptacle, said casing extending through opposed bottom and top walls of said receptacle and being secured thereto in fluid tight engagement, apertures in the wall of said casing communicating with the interior of said receptacle adjacent the bottom thereof, an outlet in said casing exteriorly of said receptacle, a reduced bore in said casing communicating with said outlet, a valve seat adjacent the inner end of said bore, a valve member slidably disposed in said bore, a valve ring on said valve member located to engage said seat to prevent flow of fluid from said casing to said outlet when said valve member is moved to one terminal position in said bore, a stem extending upwardly from said valve member, a flange on the upper end of said stem having a downwardly extending skirt portion, a cam surface on the lower edge of said skirt portion, a cam follower fixed in the wall of said casing and engageable with said cam to cause axial movement of said stem and valve member upon rotation of the same, a recess in said flange disposed eccentrically thereof, an aperture in said flange, a strainer covering said aperture, a relatively thick cover plate for the upper end of said casing secured in fluid tight relation thereto, a compression spring disposed between said cover plate and said flange for holding said cam in engagement with said follower and said valve ring in engagement with said seat when in closed position, a central aperture in said cover plate terminating in an upwardly and outwardly flared surface, an actuating handle having a body portion selectively receivable in said central aperture, and an eccentrically mounted pin depending from said body and received in said recess whereby upon rotation of said handle said valve will be opened or closed and upon removal of said handle unauthorized operation of said valve will be prevented and said flared surface will form a funnel for filling said receptacle, the fluid passing downwardly through the aperture in said flange and through the apertures in the wall of said casing into said receptacle.

2. A flow control and filling device as defined in claim 1 in which the valve member is provided with a helical groove in the peripheral surface thereof, the rate of flow of fluid through said helical groove to said outlet being determined by the portion of said helical groove withdrawn from said bore.

3. A flow control and filling device for a receptacle comprising a hollow casing disposed in said receptacle, said casing extending through opposed bottom and top walls of said receptacle and being secured thereto in fluid tight engagement, an aperture in the wall of said casing communicating with the interior of said receptacle adjacent the bottom thereof, an outlet in said casing exteriorly of said receptacle, a reduced bore in said casing communicating with said outlet, a valve seat adjacent the inner end of said bore, a valve member slidably disposed in said bore, means on said valve member located to engage said seat to prevent flow of fluid to said outlet when said valve member is moved to one terminal position in said bore, a stem extending upwardly from said valve member, a flange on the upper end of said stem having a downwardly extending skirt portion, a cam surface on the lower edge of said skirt portion, a cam follower fixed in the wall of said casing and engageable with said cam to cause axial movement of said stem and valve member upon rotation of the same, a recess in said flange disposed eccentrically thereof, an aperture in said flange, a relatively thick cover plate for the upper end of said casing secured in fluid tight relation thereto, a compression spring disposed between said cover plate and said flange for holding said cam in engagement with said follower, and said means on said valve member in engagement with said seat when in closed position, a central aperture in said cover plate terminating in an upwardly and outwardly flared surface, an actuating handle having a body portion selectively receivable in said central aperture and an eccentrically mounted pin depending from said body and received in said recess whereby upon rotation of said handle said valve will be opened or closed and upon removal of said handle unauthorized operation of said valve will be prevented and said flared surface will form a funnel for filling said receptacle, the fluid passing downwardly through the aperture in said flange and through the aperture in the wall of said casing into said receptacle.

4. A flow control and filling device as defined in claim 3 in which said cam surface is relieved at the portion thereof adjacent said cam follower when said valve member is in closed position whereby the closing engagement of said valve member and seat is caused solely by the force exerted by said compression spring.

5. A flow control and filling device for a receptacle comprising a hollow casing disposed in said receptacle, said casing extending through opposed bottom and top walls of said receptacle and being secured thereto in fluid tight engagement, an aperture in the wall of said casing communicating with the interior of said receptacle adjacent the bottom thereof, an outlet in said casing exteriorly of said receptacle, a reduced bore in said casing communicating with said outlet, a valve seat adjacent the inner end of said bore, a valve member slidably disposed in said bore, means on said valve member located to engage said seat to prevent flow of fluid to said outlet when said valve member is moved to one terminal position in said bore, a stem extending outwardly from said valve member, a flange on the upper end of said stem, a cam carried by said stem, a cam follower engageable with said cam to cause axial movement of said stem and valve member upon rotation of the same, a recess in said flange disposed eccentrically thereof, an aperture in said flange, a relatively thick cover plate for the upper end of said casing secured in fluid tight relation thereto, a compression spring disposed between said cover plate and said flange for holding said cam in engagement with said follower and the means on said valve member in engagement with said seat when in closed position, a central aperture in said cover plate terminating in an upwardly and outwardly flared surface, an actuating handle having a body portion selectively receivable in said central aperture and an eccentrically mounted pin depending from said body and received in said recess whereby upon rotation of said handle said valve will be opened or closed and upon removal of said handle unauthorized operation of said valve will be prevented and said flared surface will form a funnel for filling said receptacle, the fluid passing downwardly through the aperture in said flange and through the aperture in the wall of said casing into said receptacle.

6. A flow control and filling device for a receptacle comprising a hollow casing disposed in said receptacle, said casing extending through opposed bottom and top walls of said receptacle and being secured thereto in fluid tight engagement, an aperture in the wall of said casing communicating with the interior of said receptacle adjacent the bottom thereof, an outlet in said casing exteriorly of said receptacle, a bore in said casing communicating with said outlet, a valve seat adjacent the inner end of said bore, a valve member slidably disposed in said bore, means on said valve member located to engage said seat to prevent flow of fluid to said outlet when said valve member is moved to one terminal position in said bore, a stem extending upwardly from said valve member, a flange on the upper end of said stem, a cam carried by said stem, a cam follower engageable with said cam to cause axial movement of said stem and valve member upon rotation of the same, an aperture in said flange, a cover plate for the upper end of said casing secured in fluid tight relation thereto, a central aperture in said cover plate terminating in an upwardly and outwardly flared surface, an actuating handle having a body portion selectively receivable in said central aperture and means detachably connecting said body portion and said flange whereby upon rotation of said handle said valve will be opened or closed and upon removal of said handle unauthorized operation of said valve will be prevented and said flared surface will form a funnel for filling said receptacle, the fluid passing downwardly through the aperture in said flange and through the aperture in the wall of said casing into said receptacle.

GEORGE KOPP.

References Cited in the file of this patent
UNITED STATES PATENTS

| Number | Name | Date |
|---|---|---|
| 1,427,027 | Silvis et al. | Aug. 22, 1922 |
| 1,494,890 | Colburn | May 20, 1924 |
| 1,989,721 | Toelle | Feb. 5, 1935 |
| 2,079,348 | Hann | May 4, 1937 |
| 2,155,761 | Johnson | Apr. 25, 1939 |
| 2,496,214 | Johnson | Jan. 31, 1950 |
| 2,585,431 | Breese | Feb. 12, 1952 |